US008595699B2

(12) United States Patent
O'Carroll et al.

(10) Patent No.: US 8,595,699 B2
(45) Date of Patent: Nov. 26, 2013

(54) LOGICAL ADDRESS BASED OBJECT ORIENTED PROGRAMMING

(75) Inventors: Luan O'Carroll, Dublin (IE); Qiang Han, Ashtown (IE)

(73) Assignee: Business Objects Software Limited, Dublin (IE)

( * ) Notice: Subject to any disclaimer, the term of this patent is extended or adjusted under 35 U.S.C. 154(b) by 399 days.

(21) Appl. No.: 12/981,474

(22) Filed: Dec. 30, 2010

(65) Prior Publication Data

US 2012/0174063 A1 Jul. 5, 2012

(51) Int. Cl.
*G06F 9/44* (2006.01)
*G06F 15/16* (2006.01)

(52) U.S. Cl.
USPC .......................................................... 717/116

(58) Field of Classification Search
USPC .......................................................... 717/116
See application file for complete search history.

(56) References Cited

U.S. PATENT DOCUMENTS

| | | | | |
|---|---|---|---|---|
| 6,898,633 | B1 * | 5/2005 | Lyndersay et al. | 709/226 |
| 7,640,580 | B1 * | 12/2009 | Plotnikov et al. | 726/12 |
| 7,643,982 | B2 * | 1/2010 | Sanjar et al. | 703/21 |
| 2007/0244848 | A1 * | 10/2007 | Chu | 707/1 |
| 2007/0271550 | A1 * | 11/2007 | Backhouse | 717/115 |
| 2009/0099881 | A1 * | 4/2009 | Hanna et al. | 705/7 |

OTHER PUBLICATIONS

Wikipedia contributors; "Intentional programming"; Wikipedia, the Free Encyclopaedia http://en.wikipedia.org/w/index.php?title=Intentional_programming&oldid=321870780 (accessed Dec. 9, 2009; and Apr. 11, 2011).
Intentional Software; Date of Electronic Publication: 2002; Intentional Software Corporation, Bellevue, WA (USA); accessed Apr. 11, 2011; http://www.intentsoft.com/.
Charles Simonyi; The Death of Computer Languages, the Birth of Intentional Programming; NATO Science Committee Conference. Also published as Microsoft Technical Report MSR-TR-95-52, by Microsoft Research, Microsoft Corporation, Redmond, WA (USA); 1995 (http://citeseerx.ist.psu.edu/viewdoc/download?doi=10.1.1.19.4647&rep=rep1&type=pdf).
Wikipedia contributors; "Aspect-Oriented Programming (AOP)"; Wikipedia, the Free Encyclopaedia http://en.wikipedia.org/wiki/Aspect-oriented_programming (accessed Apr. 11, 2011).
Wikipedia contributors; "Repreentational State Transfer (REST)"; Wikipedia, the Free Encyclopaedia http://en.wikipedia.org/wiki/Representational_State_Transfer (accessed Apr. 11, 2011).
T. Berners-Lee, R. Fielding, U.C. Irvine, L. Masinter; Uniform Resource Identifiers (URI): Generic Syntax; Xerox Corporation, Norwalk, CT (USA); Published by the Internet Engineering Task Force, Fremont, CA (USA) 1998 (http://www.ietf.org/rfc/rfc2396.txt).

* cited by examiner

*Primary Examiner* — Don Wong
*Assistant Examiner* — Theodore Hebert

(57) ABSTRACT

Disclosed are methods and systems for generating resource with URI. The methods and systems involve receiving a request for processing a data, the request including an uniform resource identifier (URI), based on the URI, sending the request to an associated resource handler, instantiating set of data resources associated with the URI by calling a resource factory and processing the request by passing the set of data resources to a specific application programming interface for presenting instantiated set of data resources.

15 Claims, 7 Drawing Sheets

```
public class TestPromotion {
    public void main(String[] args)
    {
        HRService hrService = HRService.getInstance( "sap/poa/sbc" );

Resource employee = hrService.get( "employee/i012345" );
        // Approval by the current line manager
        Resource manager = employee.get( "manager" );
        Resource specialistRole = hrService.get( "roles/specialist" );

// Internally the service can translate arguments to their URIs so
        // that the resources themselves are not transferred
        Resource rc = hrService.put( "hr/promote",
                        employee,
                        specialistRole,
                        manager );
        if ( !rc.isValid() && ( rc instanceof ErrorResponse ))
            System.out.println("Sorry your promotion was not successful" );

// Fetch the updated employee
        employee = employee.update();
        Resource employeeRole = employee.get( "role" );

if ( employeeRole.equals( specialistRole ))
            System.out.println( "Congratulations on your promotion" );
    }
}
```

FIG. 2

| RESOURCE | TYPE | CONSTRAINTS |
|---|---|---|
| EMPLOYEE | ENTITY | |
| BANK | ENTITY | |
| TEAM | COLLECTION | EMPLOYEE |
| PAY ROLL | COLLECTION | PAYSLIP |
| EXPENSE ROLL | COLLECTION | EXPENSE CLAIM |
| BANK ROLL | COLLECTION | PAY ROLL, EXPENSE ROLL |

FIG. 4A

| SERVICE | INPUT | OUTPUT | OPERATION | PARTS |
|---|---|---|---|---|
| SERVICE/TIMESHEET | EMPLOYEE, PERIOD | TIMESHEET | GET | |
| SERVICE/PAY ROLL | TEAM | PAY ROLL | GET | TIMESHEET-PAY-PENSION-TAX |
| SERVICE/EXPENSE | TEAM | EXPENSE ROLL | GET | |
| SERVICE/PAYMENT | PAY ROLL, EXPENSE ROLL, BANK | BANK ROLL | GET | -ACCOUNTS |
| | | | | |

FIG. 4B

LOGICAL ADDRESS BASED OBJECT ORIENTED PROGRAMMING

FIELD

The field generally relates to logical addressing programming and is more specifically related to logical addressing of objects and classes in object oriented program.

BACKGROUND

Object Oriented Programming (OOP) is a program paradigm that uses objects in data structures including data fields and methods together with their interactions to design applications and computer programs. The OOP model mainly includes class, instance and method. In general, the classes and the object instances in the classes are assigned memory references. During program execution, memory references are used to call classes, objects associated with the program. In cases of large computer programs, using memory references to call classes and objects becomes complicated as memory references use binary relationships between memory references.

Existing solutions like Intentional Programming (IP) and Representational State Transfer (REST) have tried to overcome the use of memory references. Intentional Programming (IP) uses identity that tries to couple user interaction and natural domain language with the programming entities. However, IP does not have a clear naming structure for defining identity. For using an IP, a tool infrastructure associated with the IP has to be used. This makes IP difficult to be used by other programming communities. Another existing solution REST discloses a unique naming method and a layered approach for restructuring systems. However, it is difficult to apply key principles of REST to other programming communities.

SUMMARY

Various embodiments of systems and methods for logical address based object oriented program are described herein. The methods and systems involve receiving a request for processing a data, the request including an uniform resource identifier (URI), based on the URI, sending the request to an associated resource handler, instantiating set of data resources associated with the URI by calling a resource factory and processing the request by passing the set of data resources to a specific application programming interface for presenting instantiated set of data resources.

According to one embodiment, the requested may be processed by passing the set of data resources to a specific application programming interface (API).

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments, together with their advantages, may be best understood from the following detailed description taken in conjunction with the accompanying drawings.

FIG. 2 illustrates an exemplary program code using logical address for generating promotion according to an embodiment of the invention.

FIG. 4A is a block diagram illustrating an exemplary method for registering resources according to an embodiment.

FIG. 4B is a block diagram illustrating an exemplary HR resource according to an embodiment.

DETAILED DESCRIPTION

Figure 1:
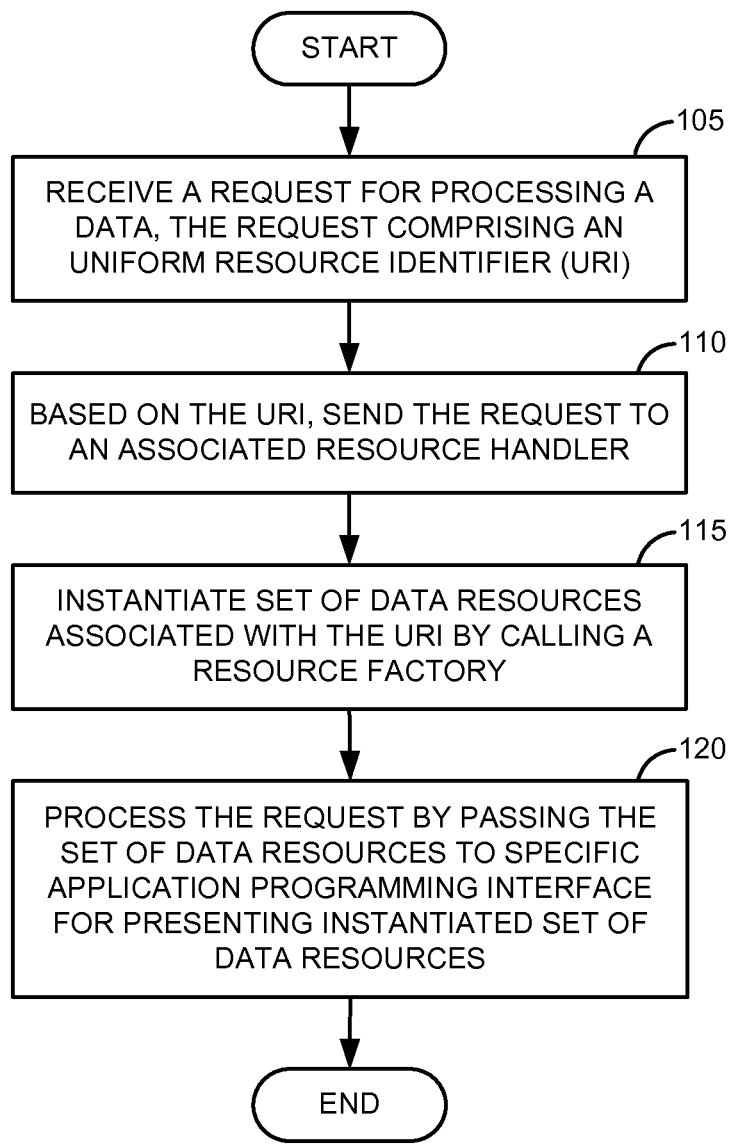
FIG. 1 is a flow diagram illustrating an exemplary method processing data associated with a resource according to an embodiment.

Embodiments of techniques for logical address based object oriented program are described herein. In the following description, numerous specific details are set forth to provide a thorough understanding of various embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Object Oriented Programming (OOP) uses three basic concepts as the fundamentals for the programming language namely class, instance and methods. A class is a template for an object, a user-defined data type that contains variables, properties, and methods. A class defines the abstract characteristics of the object, including its attributes, fields or properties. For example, the class human resources (HR) may include employee related services such as employee name, employee number, employee department and so on. The class may include an instance of the class. The instance is an actual object created at a run time. Method is a set of procedural statements for achieving the desired result.

In OOPS every object instance is unique and may have a memory foot print. The object instance is attached to a memory reference. Processing the object instance according to the memory reference is a tedious process. Therefore, logical address mapping between the resources is disclosed. The process mainly uses logical address for identifying resources such as classes and objects. The logical address may be identified through a Uniform Resource Identifier (URI).

Uniform addressing provides a common way of addressing classes and objects. The classes and objects may include data, code, state and services. Once a logical address is assigned, it may be available for use and many resources may use the same classes and objects. The interaction between the two resources may be established through the logical address.

According to one embodiment, a new software component may be created in the logical address based object oriented program model by requesting a resource through the URI. Unlike the traditional approach of OOP the new resource is not created directly and unlike OOP the calling component does not control the newly created resource. The calling software component does not control the lifecycle of the newly created object.

In a logical address based object oriented program model a software component may be built or assembled through a logical association of sub-components. Generally, the component names the sub-components that it may use. In the logical address based object oriented program model since the logical address is used to identify resources, there is no impact even if the resource name changes. Since the resources are used by name it is not necessary to explicitly pass arguments or dependencies.

Consider a business scenario explaining the difference between a logical addressing and memory reference addressing. 'John Smith' was a HR manager, replaced by a new HR manager 'John Doe'. By using logical address based object oriented program any process involving the HR manager will not be affected as the HR manager may be referred using the logical address 'hr/manager'. Whereas in traditional OOP approach, the process would be affected since memory reference object refers to the name of the HR Manager.

Objects or resource associated with an application has a uniform resource identifier (URI). The URI incorporates the semantics of the application with an URI schema. For instance, object API 'Employee Promotion' is given an URI "hr/promote". The URI indicates that the API belongs to HR function module and it is about promotion. The URI based address space enables the user to map using the URI convention. There may be other address spaces in the HR function module such as hr/payroll, hr/hiring, hr/candidates and so on. But the URI "hr/promote" directs that the request refers to address space "hr/promote". Such address mapping allows organizing data in a business oriented manner.

A resource repository includes plurality of resources. During the identification process of resources associated with a request, the resource repository maps the URI in the request and relates it to a specific object class in OOP. The semantic address may be the URI address and the corresponding physical programming unit may be a class in OOP. To be present in the resource repository, a resource may register according to its URI. For instance, employee is a resource that registered with its URI "hr/employee/{id}". The employee resource may be registered along with its implemented entity class, employee, which represents a row in employee table within HR database. In another instance, a promotion logic may register as "hr/promote" with a set of arguments with its implemented entity class. The implemented entity class may include function along with the objects required to deliver the promotion logic. For example, a function may be HRService.promote (ID, manager, role). The objects may be the ID of the employee, manager ID and the role to which the employee is promoted.

FIG. 1 is a flow diagram illustrating an exemplary method processing a data associated with resource according to an embodiment. At process block 105, a request is received for processing a data. The request includes a URI. In one embodiment, the request may also include a set of arguments. According to one embodiment, the URI may be a logical address of the object or resource. At process block 110, the request is sent to an associated resource handler based on the URI. In one embodiment, the resource handler may be a routing component. The resource handler is a routing component that provides initial access to other resources. The resource handler may map various resource implementations into a URI. At process block 115, a set of data resources associated with the URI are instantiated by calling a resource factory. The resource factory separates logical address from physical object instances associated with the set of data resources. The set of data resources associated with the URI may be retrieved from a resource repository. The resource repository includes plurality of resources registered according to the URI. At process block 120, the request is processed by passing the set of data resources to a specific application programming interface for presenting instantiated set of data resources.

According to one embodiment, sending the request to an associated resource handler includes sending the request to one or more resource handlers which may be linked to one another. The linking of the one or more resource handlers may be provided by routing information. When a request is made for processing data, the application associated with the data processing may need to know the URI of the requested resource. The implementation of the resource may be determined by the routing information.

In another embodiment, the API identifies addressable objects in the request. The addressable program interface may include specifications for objects and classes used to communicate between the user request and the implementer of the API.

In yet another embodiment, the resource handler determines a function module associated with the resource handler according to the URI. According to yet another embodiment, the routing component including the resource handler identifies various resources to be grouped to achieve a desired result. For instance, to achieve promotion logic, resources such as employee, manager may be grouped.

In yet another embodiment, the URI may be used for identifying resources. URI's support structuring addresses into namespaces and hierarchies that provide a logical partition of the address space. For instance, a promote object associated with the HR may have URI as "hr/promote". URI may also express information about the resource that it refers to. Any additional metadata embedded in a URI might be provided to assist consumption rather than being required to actually identify the object. Objects should be registered so that the object can be retrieved according to its URI.

Consider a business scenario for the above described process. Consider receiving a request in form of code including URI string and set of arguments. An exemplary code segment may be Resource rc=hrservice.put ("hr/promote",
  employee,
  specialistRole,
  manager);

In the exemplary code, HR service request "hrservice.put" is an addressable URI. The addressable URI includes objects URI, employee, role and manager. The addressable API passes the request to a routing component. The routing component may be a resource handler. In this scenario, the resource handler may be a HR resource handler. An instance of the resource handler is created to determine the URI address "hr/promote". From the request it is determined that the request is related to HR function module. A resource factory associated with the HR is called. The resource factory retrieves set of resources required by the promotion logic to perform the promotion. In this scenario, resources such as employee, role and manager are retrieved. The set of resources or objects related to the request "hr/promote" is instantiated. On instantiating, the set of data is passed to a specific API to process the request. On processing the request, the result is returned as a resource including a URI. In this business scenario, the employee data with new role is returned with URI.

FIG. 2 illustrates an exemplary program code using logical address for generating promotion according to an embodiment of the invention. According to the program 200, HR service is placed in a name space "sap/poa/sbc". The name space is an abstract container providing context for the items such as names or words. The name space "sap/poa/sbc" may be used for factories and the object instances. In this example, factory is HR as the name space is associated with HR service. An object instance is created at a run time. The name space may be used to reference other objects created via the service and the factory it refers to.

The program 200 illustrates three addressable API's namely employee, manager and role. The program also includes a set of arguments 205. The program is processed according to the business scenario described in FIG. 1.

The result of the exemplary program is returned as follows:

```
Employee employee = new Employee("i012345");
Manager manager = new Manager("i456798");
Role specialistRole = new Role("specialist");
```

Figure 3:
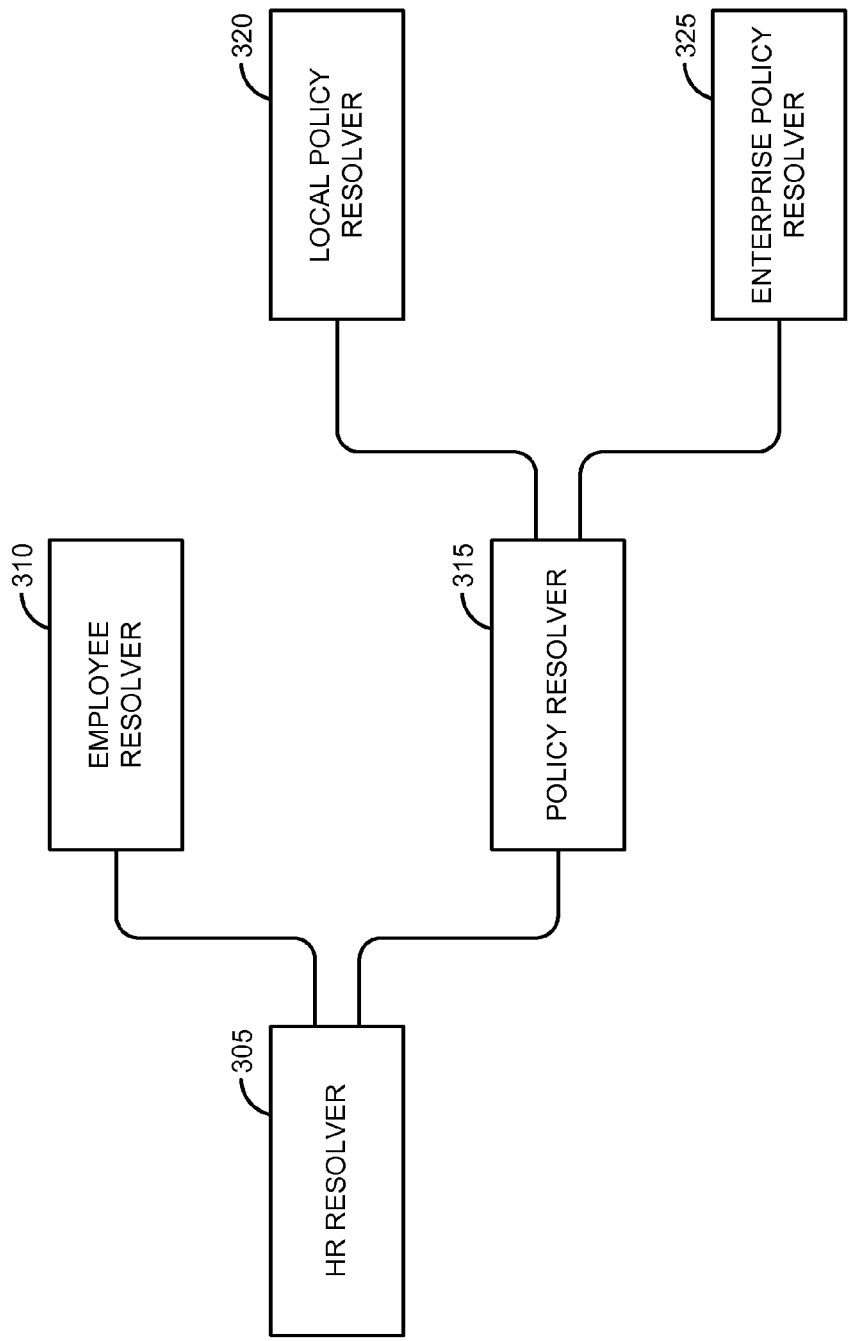
FIG. 3 is a block diagram illustrating an exemplary hierarchy of an HR resource handler according to an embodiment.

FIG. 3 is a block diagram illustrating an exemplary hierarchy of HR resource handler according to an embodiment. The HR resource handler may be referred as an HR resolver. The HR resolver 305 may be linked to employee resolver 310 and policy resolver 315. The policy resolver 315 may be linked to local policy resolver 320 and enterprise policy resolver 325. For instance, in a request including the URI "hr/policy/work time", it is determined that the request belongs to the local policy resolver 320. Table 1 below illustrates URIs and resource handlers associated with the URI.

TABLE 1

| URI | Handler |
| --- | --- |
| /hr/employee/i123456 | Employee Resolver |
| /hr/policies/working-time | Local Policy Resolver |
| /hr/policies/stock-trading | Enterprise Policy Resolver |
| /hr/policies/local | Local Policy Resolver |

For instance, row 1 in Table 1 shows a URI "hr/employee/i123456". By the URI "hr/employee", it is determined that the request is related to HR and employee. The resource HR may include various resource handlers for various functions. Since the request directs to an employee, an employee resolver is determined. Similarly, URI "hr/policy/stock-trading directs the request to an enterprise policy resolver.

FIG. 4A is a block diagram illustrating an exemplary method for registering resources according to an embodiment. Table 400A illustrates resources registered according to their URIs. The URI of the resource includes the name of the resource. The first column 405 of the table 400A illustrates name of the resource, the second column 410 of the resource illustrates the type of the resource and the third column 415 illustrates constraints of the resource. The resources may be of two types namely homogeneous or heterogeneous. According to one embodiment, the resources may be collections of other resources, these collections may be homogenous. For instance, pay roll may be a collection of pay slips. An example of heterogeneous resource may be a bank roll which may include resources of different types such as pay roll and expense roll.

FIG. 4B is a block diagram illustrating an exemplary HR resource according to an embodiment. Table 400B specifies a service registered according to URI in first column 420, input in second column 425, output in third column 430, operation in fourth column 435 and parts in fifth column 440. Consider a scenario of receiving a request to fetch a time sheet for an employee, the request may also specify input and output such as employee period and timesheet respectively. The result returned may be to get time sheet according to a specific period.

According to one embodiment, collection of resources may be specified as in case of pay roll service that may use other services such as team collection, fetching time sheets for each employee in the team, calculating pay, pension and tax for each employee, and the like.

Figure 5:
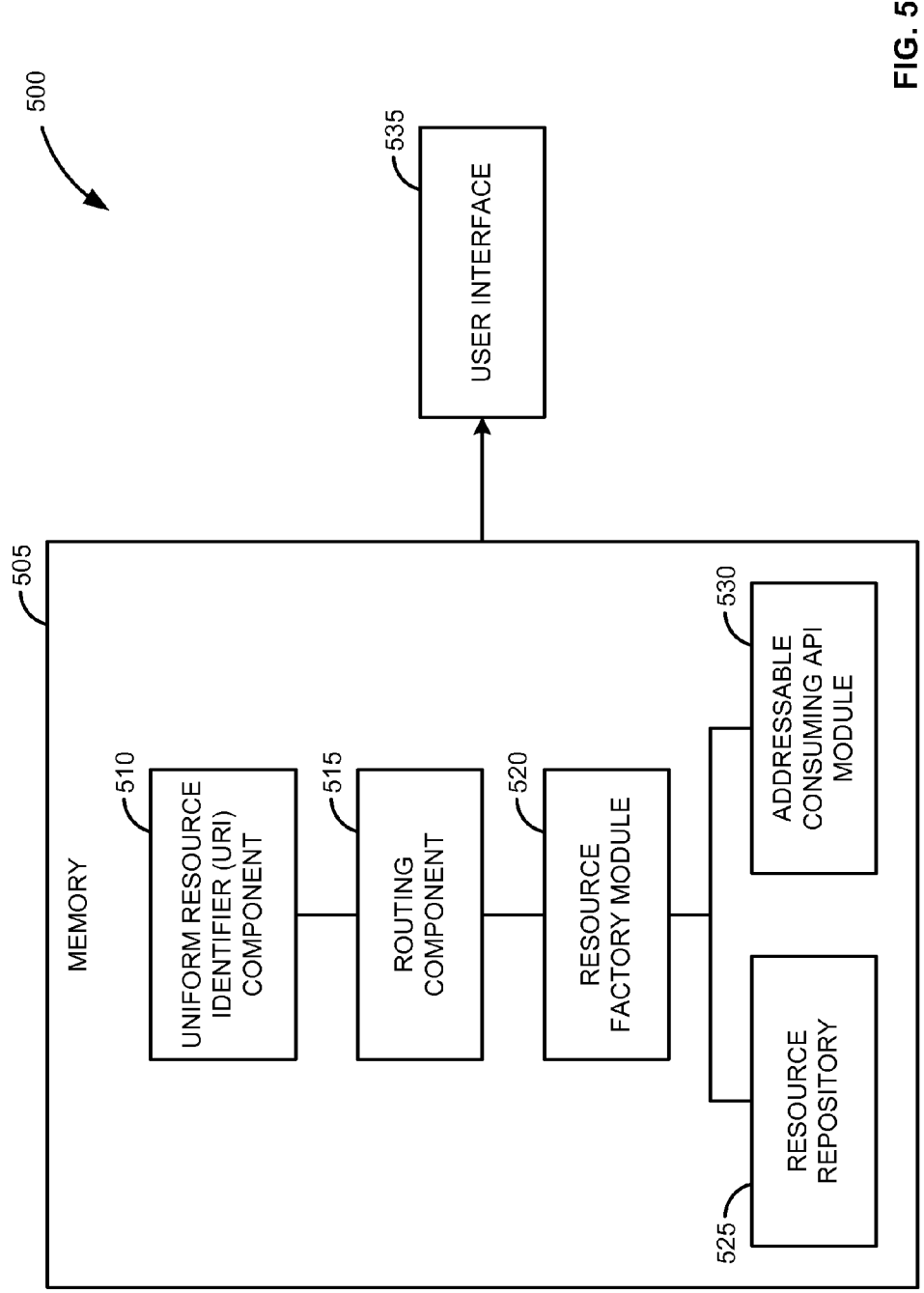
FIG. 5 is a block diagram illustrating a computer system for processing data associated with a resource according to an embodiment.

FIG. 5 is a block diagram illustrating a computer system for processing a data associated with a resource according to an embodiment. The computer system 500 includes a memory 505 further including URI component 510, a routing component 515, a resource factory module 520, a resource repository 525, and an addressable consuming API module 530. The URI component 510 receives a request to process data. The request includes an URI. The URI component 510 identifies resources that may be addressable. The request is passed to an associated routing component 515 including a resource handler based on the URI. Based on the URI, the request may be sent to one or more resource handlers which may be linked to one another. The resource handler creates an instance to determine a function module associated with the URI. The resource factory module 520 instantiates the set of data resources associated with the URI. The resource factory module 520 separates the logical address from the physical object instances in the memory 505. The resource factory module 520 retrieves the data resources from a resource repository 525. The request is processed by passing the instantiated set of data resources to addressable consuming API module 530. The results of the processed request may be presented on a user interface 535.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
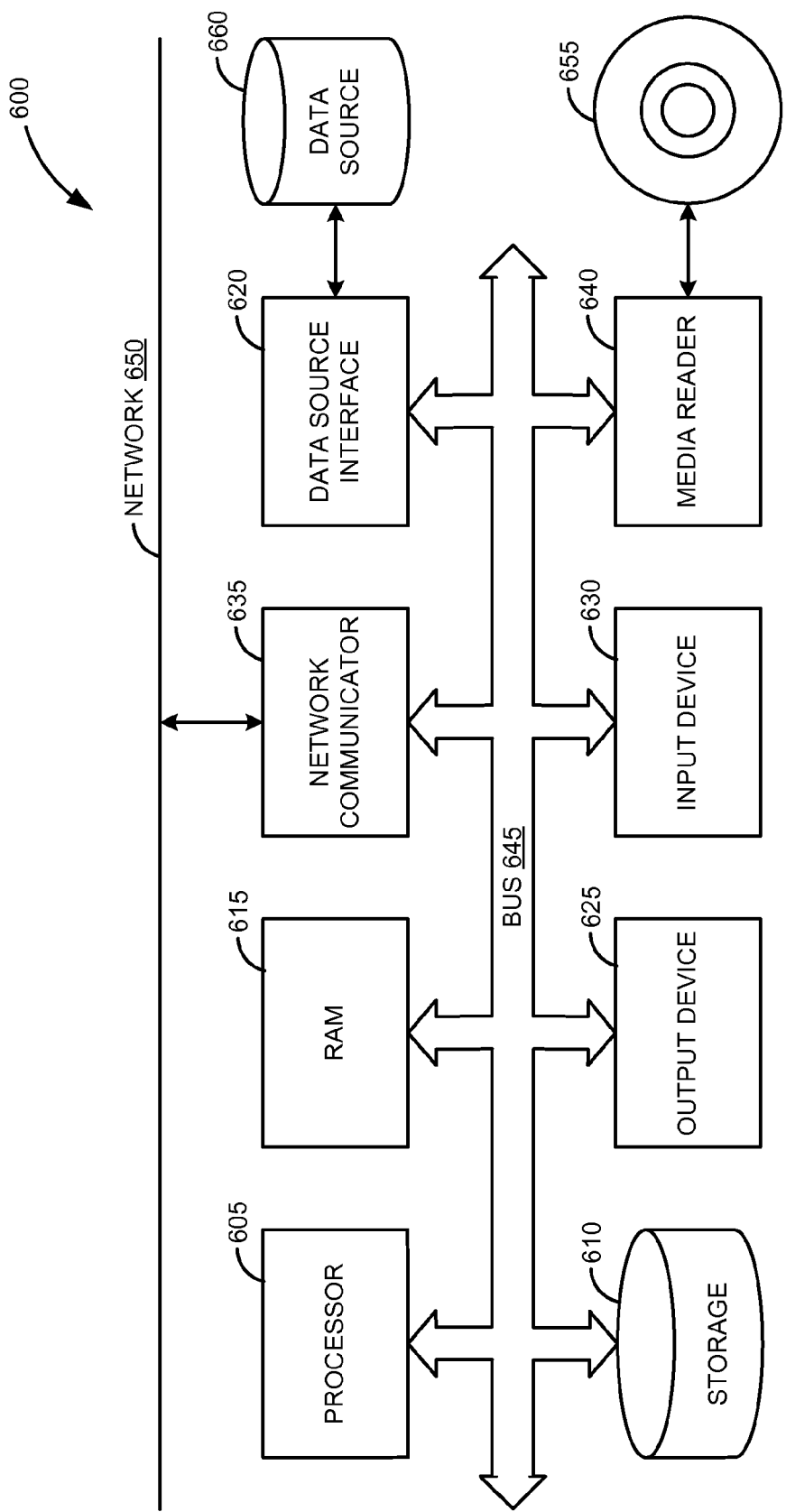
FIG. 6 is a block diagram of an exemplary computer system according to an embodiment.

FIG. 6 is a block diagram of an exemplary computer system 600 according to an embodiment. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interacting with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however, that the invention can be practiced without one or more of the specific details or with other methods, components, techniques, etc. In other instances, well-known operations or structures are not shown or described in detail to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   receive a request for processing at least one data resource from a plurality of data resources, the request comprising a uniform resource identifier (URI), and one or more arguments;
   based on a logical address associated with the URI, send the request to an associated resource handler to identify the at least one data resource of the plurality of data resources, corresponding to the request;
   map the at least one identified data resource into the URI to associate the at least one identified data resource with at least one object instance;
   instantiate the at least one mapped data resource by calling a resource factory; and
   based on the logical address associated with the at least one instantiated data resource, process the request by sending the at least one instantiated data resource to an application programming interface and displaying the at least one data resource associated with the request on a user interface.

2. The article of manufacture in claim 1, wherein sending the request to the associated resource handler comprises sending the request through a routing component associated with the resource handler.

3. The article of manufacture in claim 1, wherein sending the request to the associated resource handler comprises sending the request to one or more linked resources handlers.

4. The article of manufacture in claim 1, wherein sending the request to the resource handler comprises, sending the request for determining a function module associated with the resource handler.

5. The article of manufacture in claim 1, wherein instantiating the at least one data resource of the plurality of data resources by calling the resource factory comprises retrieving the at least one data resource of the plurality of data resources from a resource repository.

6. A computer system for processing a request to access data associated with a resource, the computer system comprising:
a processor;
a memory communicatively coupled with the processor and configured to store instructions related to:
receiving a request for processing at least one data resource from a plurality of data resources, the request comprising a uniform resource identifier (URI), and one or more arguments;
based on a logical address associated with the URI, sending the request to an associated resource handler to identify the at least one data resource of the plurality of data resources, corresponding to the request;
mapping the at least one identified data resource into the URI to associate the at least one identified data resource with at least one object instance;
instantiating the at least one mapped data resource by calling a resource factory; and
based on the logical address associated with the at least one instantiated data resource, processing the request by sending the at least one data resource to an application programming interface and displaying the one or more data resources associated with the request on a user interface.

7. The computer system of claim 6, wherein the memory comprises a resource repository for storing the plurality of data resources.

8. The computer system of claim 6, wherein the memory comprises instructions related to: an addressable application programming interface module to identify one or more addressable objects in the request.

9. A computerized method for processing a request to access data associated with a resource, the method comprising:
receiving a request for processing at least one data resource from a plurality of data resources, the request comprising a uniform resource identifier (URI), and one or more arguments;
based on a logical address associated with the URI, sending the request to an associated resource handler to identify the at least one data resource of the plurality of data resources, corresponding to the request;
mapping the at least one identified data resource into the URI to associate the at least one identified data resource with at least one object instance;
instantiating the at least one mapped data resource by calling a resource factory; and
based on the logical address associated with the at least one instantiated data resource, processing the request by sending the the at least one data resource to an application programming interface and displaying the at least one data resource associated with the request on a user interface.

10. The computerized method of claim 9, wherein sending the request to the associated resource handler comprises sending the request to one or more linked resources handlers.

11. The computerized method of claim 9, wherein sending the request to the resource handler comprises sending the request for determining a function module associated with the resource handler.

12. The computerized method of claim 9, wherein instantiating the at least one data resource of the plurality of data resources by calling the resource factory comprises retrieving the at least one data resource of the plurality of data resources from a resource repository.

13. The article of manufacture of claim 1, wherein the resource factory separates the logical address and the at least one object instance associated with the at least one data resource.

14. The computer system of claim 6, wherein the resource factory separates the logical address and the at least one object instance associated with the at least one data resource.

15. The computerized method of claim 9, wherein the resource factory separates the logical address and the at least one object instance associated with the at least one data resource.

* * * * *